(12) United States Patent
Salters (10) Patent No.: US 10,618,613 B2
(45) Date of Patent: *Apr. 14, 2020

(54) DITHERED MARINE UV REFLECTIVE COATING WITH COLOR

(71) Applicant: KONINKLIJKE PHILIPS N.V., Eindhoven (NL)

(72) Inventor: Bart Andre Salters, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 5 days.

This patent is subject to a terminal disclaimer.

(21) Appl. No.: 15/740,372

(22) PCT Filed: Jun. 17, 2016

(86) PCT No.: PCT/EP2016/063971
§ 371 (c)(1),
(2) Date: Dec. 28, 2017

(87) PCT Pub. No.: WO2017/001209
PCT Pub. Date: Jan. 5, 2017

(65) Prior Publication Data
US 2018/0186436 A1 Jul. 5, 2018

(30) Foreign Application Priority Data

Jun. 30, 2015 (EP) .................................... 15174424

(51) Int. Cl.
*B63B 59/04* (2006.01)
*B08B 17/02* (2006.01)
(Continued)

(52) U.S. Cl.
CPC ............. *B63B 59/04* (2013.01); *B01J 19/123* (2013.01); *B08B 17/02* (2013.01); *G02B 6/0043* (2013.01);
(Continued)

(58) Field of Classification Search
CPC ........ B63B 59/04; B01J 19/123; B08B 17/02; G02B 6/0043; G02B 6/102; G02B 6/12033; G02B 19/0061
(Continued)

(56) References Cited

U.S. PATENT DOCUMENTS

| 10,252,783 B2 * | 4/2019 | Salters ................. B08B 17/02 |
| 2004/0146791 A1 | 7/2004 | Sakurada et al. |
| 2013/0048877 A1 | 2/2013 | Thoren et al. |

FOREIGN PATENT DOCUMENTS

| JP | S5675290 A | 6/1981 |
| WO | 2009011922 A1 | 1/2009 |

(Continued)

*Primary Examiner* — Nicole M Ippolito (57) ABSTRACT

The invention provides a vessel (1) comprising a hull (21) with a coating layer (100), the vessel (1) further comprising an anti-biofouling system (200) comprising an optical medium and a light source configured to provide UV radiation, wherein the optical medium (270) is transmissive for light, wherein the optical medium comprises a radiation escape surface and a second optical medium surface with at least part of the transmissive optical medium material configured between said radiation escape surface and said second optical medium surface, wherein the optical medium is configured adjacent to at least part of the coating layer with the second optical medium surface configured closer to the hull (21) than the radiation escape surface, wherein the anti-biofouling system (200) is configured to provide said UV-radiation downstream from said radiation escape surface in a direction away from said hull (21), and wherein the vessel (1) further comprises a pattern comprising colored segments and UV reflective segments with at least part of the transmissive optical medium material configured between said pattern and said radiation escape surface.

14 Claims, 5 Drawing Sheets

(51) Int. Cl.
  *B01J 19/12* (2006.01)
  *F21V 8/00* (2006.01)
  *G02B 6/10* (2006.01)
  *G02B 6/12* (2006.01)
  *G02B 19/00* (2006.01)

(52) U.S. Cl.
  CPC .......... *G02B 6/102* (2013.01); *G02B 6/12033* (2013.01); *G02B 19/0061* (2013.01)

(58) Field of Classification Search
  USPC ... 250/453.11, 454.11, 455.11, 493.1, 494.1, 250/504 R
  See application file for complete search history.

(56) References Cited

FOREIGN PATENT DOCUMENTS

| | | |
|---|---|---|
| WO | 2014173834 A1 | 10/2014 |
| WO | 2014188347 A1 | 11/2014 |

* cited by examiner

DITHERED MARINE UV REFLECTIVE COATING WITH COLOR

CROSS-REFERENCE TO PRIOR APPLICATIONS

This application is the U.S. National Phase application under 35 U.S.C. § 371 of International Application No. PCT/EP2016/063971, filed on 17 Jun. 2016, which claims the benefit of European Patent Application No. 15174424.0, filed on 30 Jun. 2015. These applications are hereby incorporated by reference herein.

FIELD OF THE INVENTION

The invention relates to a vessel comprising an anti-biofouling system. The invention further relates to an optical medium (unit), which may be comprised by such anti-bio fouling system. The invention also relates to a method of configuring the anti-biofouling system to a vessel.

BACKGROUND OF THE INVENTION

Anti-biofouling methods are known in the art. US2013/0048877, for instance, describes a system for anti-biofouling a protected surface, comprising an ultraviolet light source configured to generate ultraviolet light, and an optical medium disposed proximate to the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

SUMMARY OF THE INVENTION

Biofouling or biological fouling (herein also indicated as "fouling") is the accumulation of microorganisms, plants, algae, and/or animals on surfaces. The variety among biofouling organisms is highly diverse and extends far beyond attachment of barnacles and seaweeds. According to some estimates, over 1700 species comprising over 4000 organisms are responsible for biofouling. Biofouling is divided into microfouling which includes bio film formation and bacterial adhesion, and macrofouling which is the attachment of larger organisms. Due to the distinct chemistry and biology that determine what prevents organisms from settling, these organisms are also classified as hard or soft fouling types. Calcareous (hard) fouling organisms include barnacles, encrusting bryozoans, mollusks, polychaete and other tube worms, and zebra mussels. Examples of non-calcareous (soft) fouling organisms are seaweed, hydroids, algae and bio film "slime". Together, these organisms form a fouling community.

In several circumstances biofouling creates substantial problems. Machinery stops working, water inlets get clogged, and hulls of ships suffer from increased drag. Hence the topic of anti-fouling, i.e. the process of removing or preventing fouling from forming, is well known. In industrial processes, bio-dispersants can be used to control biofouling. In less controlled environments, organisms are killed or repelled with coatings using biocides, thermal treatments or pulses of energy. Non-toxic mechanical strategies that prevent organisms from attaching include choosing a material or coating with a slippery surface, or creation of nanoscale surface topologies similar to the skin of sharks and dolphins which only offer poor anchor points. Biofouling on the hull of ships causes a severe increase in drag, and thus increased fuel consumption. It is estimated that an increase of up to 40% in fuel consumption can be attributed to biofouling. As large oil tankers or container transport ships can consume up to €200.000 a day in fuel, substantial savings are possible with an effective method of anti-biofouling.

It surprisingly appears that one may effectively use UV radiation to substantially prevent biofouling on surfaces that are in contact with sea water or water in lakes, rivers, canals, etc. Herewith, an approach is presented based on optical methods, in particular using ultra-violet light or radiation (UV). It appears that most micro-organisms are killed, rendered inactive or unable to reproduce with sufficient UV light. This effect is mainly governed by the total dose of UV light. A typical dose to kill 90% of a certain micro-organism is 10 mW/h/m$^2$.

Application of anti-fouling radiation may not be always straigthforward. One may use an optical medium to irradiate large areas but this solution may only be possible e.g. during a break in a harbor.

Surprisingly, a good solution appears to be the application of the optical media as a kind of second skin. A UV emitting element comprising such optical medium is associated with e.g. a hull of a ship and UV radiation emanates from a radiation escape surface of the UV emitting element (in a direction away of the hull of the vessel). This radiation escape surface may then be configured as part of the external surface of the object.

In general, an UV reflective coating may need to be applied on the hull itself to achieve the desired efficiency with the optical medium. Such UV reflective coating is typically substantially white. Hence, by applying an optical medium on the hull and/or especially by applying such UV reflective coating, the uniformity of the color of the hull is decreased and/or the appearance is substantially changed. However, for shipping owners the company color may be an important visual aspect. In view of recognizability of the vessels, the fleet has specific colors, which needs to be preserved, even when means for preventing or removing biofouling are applied on the hull.

Hence, it is an aspect of the invention to provide an alternative vessel and/or alternative optical medium (for an anti-biofouling system), which preferably further at least partly obviate(s) one or more of above-described drawbacks.

In a first aspect, the invention provides a vessel comprising a hull with a coating layer ("coating"), the vessel further comprising an anti-biofouling system comprising an optical medium and a light source configured to provide UV radiation, wherein the optical medium is transmissive for light, wherein the optical medium comprises a radiation escape surface ("escape surface") and a second optical medium surface ("second surface") with at least part of the transmissive optical medium material configured between said radiation escape surface and said second optical medium surface, wherein the optical medium is configured adjacent to at least part of the coating layer with the second optical medium surface configured closer to the hull than the radiation escape surface, wherein the anti-bio fouling system is configured to provide said UV-radiation downstream from said radiation escape surface in a direction away from said hull, and wherein the vessel further comprises a pattern comprising colored segments and UV reflective segments with at least part of the transmissive optical medium material configured between said pattern and said radiation escape surface.

With such pattern, basically two effects may be achieved: (a) a dithering of the coating color, such that a viewer at some distance, such as at least 5 m, like at least 10 m, such as at least 50, like at least 100 m, does not substantially perceive a difference in the color between the (original) color of the coating of the hull (surrounding at least part of the optical medium) and the (original) color of the coating behind the optical medium, and (b) increase in UV radiation extraction from the escape surface, as UV radiation coupling out at the second surface will at least partly be reflected (back into the optical medium) by the reflective segments. Hence, especially a dithered pattern comprising colored segments and UV reflective segments (behind an optical medium) may be used to provide enhanced light extraction from the optical medium and to perceive a desired color with a predetermined tint through the optical medium. The reflective segments are especially configured to reflect UV radiation.

Herein, the term "vessel" may e.g. refer to e.g. a boat or a ship, etc., such as a sail boat, a tanker, a cruise ship, a yacht, a ferry, a submarine, etc. etc.

The hull comprises an external surface comprising said coating, such as a coating applied to the hull. Especially, the coating is configured as external surface of the hull. The term "external surface" especially refers to the surface that may be in physical contact with water. Due to this contact with the water, biofouling may occur, with the above indicated disadvantages. Bio fouling will occur at the surface of an external surface ("surface) of such vessel. The surface of an (element of the) vessel to be protected may comprise steel, but may optionally also comprise another material, such as e.g. selected from the group consisting of wood, polyester, composite, aluminium, rubber, hypalon, PVC, glass fiber, etc. Hence, instead of a steel hull, the hull may also be a PVC hull or a polyester hull, etc. Instead of steel, also another iron material, such as an (other) iron alloys may be used.

Herein, the term "fouling" or "biofouling" or "biological fouling" are interchangebly used. Above, some examples of fouling are provided. Bio fouling may occur on any surface in water, or close to water and being temporarily exposed to water. On such surface biofouling may occur when the element is in, or near water, such as (just) above the water line (like e.g. due to splashing water, such as for instance due to a bow wave). Between the tropics, biofouling may occur within hours. Even at moderate temperatures, the first (stages of) fouling will occur within hours; as a first (molecular) level of sugars and bacteria.

The anti-biofouling system may at least comprise an UV emitting element. The UV emitting element comprises the optical medium and optionally one or more light sources. The latter may optionally (at least partly) be embedded in the former (see also below). The term "anti-biofouling system" may also refer to a plurality of such systems, optionally functionally coupled to each other, such as e.g. controlled via a single control system. Further, the anti-biofouling system may comprise a plurality of such UV emitting elements. Herein, the term "UV emitting element" may (thus) refer to a plurality of UV emitting elements.

As indicated above, the radiation escape surface may be configured as a kind of skin to the coating (of the hull). Hence, the surface of the optical medium may now suffer from fouling. The surface or area on which fouling may be generated is herein also indicated as fouling surface. To this end, the UV emitting element provides UV radiation (anti-fouling light) that is applied to prevent formation of biofouling and/or to remove biofouling. This UV radiation (anti-fouling light) especially at least comprises UV radiation (also indicated as "UV light"). Hence, the UV emitting element is especially configured to provide UV radiation. Thereto, the UV emitting element comprises a light source.

The term "light source" may also relate to a plurality of light sources, such as 2-20 (solid state) LED light sources, though many more light sources may also be applied. Hence, the term LED may also refer to a plurality of LEDs. Especially, the UV emitting element may comprise a plurality of light sources. Hence, as indicated above, the UV emitting element comprises one or more (solid state) state light sources. The LEDs may be (OLEDs or) solid state LEDs (or a combination of these LEDs). Especially, the light source comprises solid state LEDs. Hence, especially, the light source comprises a UV LED configured to provide one or more of UVA and UVC light (see also below). UVA may be used to impair cell walls, whereas UVC may be used to impair DNA. Hence, the light source is especially configured to provide the UV radiation. Herein, the term "light source" especially refers to a solid state light source.

Ultraviolet (UV) is that part of electromagnetic light bounded by the lower wavelength extreme of the visible spectrum and the X-ray radiation band. The spectral range of UV light is, by definition between about 100 and 400 nm (1 nm=$10^{-9}$ m) and is invisible to human eyes. Using the CIE classification the UV spectrum is subdivided into three bands: UVA (long-wave) from 315 to 400 nm; UVB (medium-wave) from 280 to 315 nm; and UVC (short-wave) from 100 to 280 nm. In reality many photobiologists often speak of skin effects resulting from UV exposure as the weighted effect of wavelength above and below 320 nm, hence offering an alternative definition.

A strong germicidal effect is provided by the light in the short-wave UVC band. In addition erythema (reddening of the skin) and conjunctivitis (inflammation of the mucous membranes of the eye) can also be caused by this form of light. Because of this, when germicidal UV-light lamps are used, it is important to design systems to exclude UVC leakage and so avoid these effects. In case of immersed light sources, absorption of UV light by water may be strong enough that UVC leaking is no problem for humans above the liquid surface. Hence, in an embodiment the UV radiation (anti-fouling light) comprises UVC light. In yet another embodiment, the UV radiation comprises radiation selected from a wavelength range of 100-300 nm, especially 200-300 nm, such as 230-300 nm. Hence, the UV radiation may especially be selected from UVC and other UV radiation up to a wavelength of about 300 nm. Good results are obtained with wavelengths within the range of 100-300 nm, such as 200-300 nm.

The UV emitting element is especially configured to irradiate with said UV radiation (during an irradiation stage) water adjacent to said radiation escape surface. Hence, in this invention especially the "original" external surface may be extended with a module, especially a relatively flat module, that is attached (or slightly remote) to the "original" external surface of the vessel, whereby the module itself forms in fact the external surface. For instance, such module may be associated to the hull of a vessel, whereby the module forms (at least part of) the external surface. Hence, the vessel may comprise a hull, and the UV emitting element, especially the optical medium, is attached to said hull. The term "radiation escape surface" may also refer to a plurality of radiation escape surfaces (see also below). Hence, at least part of the external surface of the vessel (especially the hull) may comprise the radiation escape surface.

In an embodiment, a significant amount of a protected surface to be kept clean from fouling, preferably the entire protected surface, e.g. the hull of a ship, may be covered with a layer that emits germicidal light ("anti-fouling light"), in particular UV light.

Hence, in an embodiment the anti-fouling lighting system may comprise an optical medium, wherein the optical medium comprises a waveguide, such as an optical fiber, configured to provide said UV radiation (anti-fouling light) to the fouling surface. The surface of e.g. the waveguide from which the UV radiation (anti-fouling light) escapes can also indicated as emission surface. In general, this part of the waveguide may at least temporarily be submerged. Due to the UV radiation (anti-fouling light) escaping from the emission surface, that the surface that during use is at least temporarily exposed to the liquid (such as seawater), may be irradiated, and thereby anti-fouled. However, the emission surface per se may also be anti-fouled. This effect is used in some of the embodiments of the UV emitting element comprising an optical medium described below.

Embodiments with optical media are also described in WO2014188347. The embodiments in WO2014188347 are herein also incorporated by reference.

As indicated above, the UV emitting element may especially comprise a UV radiation escape surface. Hence, in a specific embodiment the UV emitting element comprises a UV radiation escape surface, with the UV emitting element especially being configured to provide said UV radiation downstream from said UV radiation escape surface of said UV emitting element. Such UV radiation escape surface may be an optical window through which the radiation escapes from the UV emitting element. Alternatively or additionally, especially the UV radiation escape surface may be the surface of a waveguide. Hence, UV radiation may be coupled in the UV emitting element into the waveguide, and escape from the element via a (part of a) face of the waveguide. As also indicated above, in embodiments the radiation escape surface may optionally be configured as part of the external surface of the object.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

As indicated above, the vessel may comprise a plurality of radiation escape surfaces. In embodiments, this may refer to a plurality of anti-biofouling systems. However, alternatively or additionally, in embodiments this may refer to an anti-biofouling system comprising a plurality of UV radiation emitting elements. Such anti-biofouling system may thus especially include a plurality of light sources for providing UV radiation. However, alternatively or additionally, in embodiments this may (also) refer to an UV emitting element comprising a plurality of light sources configured to provide the UV radiation. Note that an UV emitting element with a single UV radiation escape surface may (still) include a plurality of light sources.

The anti-biofouling system is especially configured to provide UV radiation to water adjacent to the radiation escape surface. In this way, biofouling may be reduced or prevented. This especially implies that during an irradiation stage the UV radiation is applied. Hence, there may optionally also be periods wherein no UV radiation is applied at al. This may (thus) not only be due to e.g. a control system switching of one or more of the UV emitting elements, but may e.g. also be due to predefined settings such as day and night or water temperature, etc. For instance, in an embodiment the UV radiation is applied in a pulsed way.

The coating layer on the hull may in embodiments include an anti-corrosion layer. Further, the coating layer may include a paint layer. The latter layer may especially be a color that is associated with a specific company, trademark, etc. etc. Further, the former layer may be provided directly on the hull and the latter layer may especially be provided on said anti-corrosion layer. Hence, the coating layer may comprise one or more of an anti-corrosion layer and a colored paint layer. The coating layer may optionally also refer to a specific area on the hull, as at different positions different coating layers may be provided, e.g. to provide differently colored coating layers at different positions on the hull. The invention may be of specific relevance when the color layer (herein also indicated as paint layer or first color layer or colored layer) has a color not being white or black, but any other color, optionally also including grey.

When directly applying an optical medium to said coating layer one may already perceive some color difference or at least appearance difference between part of the coating layer not covered with the optical medium and part of the coating layer covered with the optical medium (for instance assuming that not the entire coating layer is covered with the optical medium). Especially, when also a (continuous or discontinuous) reflective layer would be applied between the (original) coating layer and the radiation escape surface of the optical medium, the original color of the coating layer will not be perceived anymore when viewing through the optical medium in the direction of the (original) coating layer. To this end, the reflective coating may especially be provided in a dithered pattern, with further especially darker colored segments to correct for the white reflective segments. Therefore, the invention provides as indicated above the pattern comprising colored segments and UV reflective segments with at least part of the transmissive optical medium material configured between said pattern and said radiation escape surface.

The pattern may essentially consist of one or more of (i) colored segments and (ii) reflective segments. Colored segments together with a continuous reflective layer may be configured such that the pattern comprising colored segments and reflective segments is obtained. Likewise, reflective segments together with a continuous colored layer may be configured such that the pattern comprising colored segments and reflective segments is obtained. Of course, the combination of colored segments and reflective segments may also provide the pattern.

The reflective segments may be provided as discontinuous layer, such as a layer in the form of e.g. a checkerboard. Likewise, the colored segments may be provided as discontinuous layer, such as a layer in the form of e.g. a checkerboard. The colored segments and the reflective segments may be configured in the same plane, such as a checkerboard configured layer. However, alternatively a configuration of a checkerboard layer over a continuous layer may also be applied.

One or more of the reflective segments and colored segments, especially the reflective segments, may be at least partly enclosed by the optical medium. In such embodiments, there is still transmissive optical medium material between the one or more of reflective segments and colored segments and the light escape surface, to allow transport of the UV radiation through the optical medium. For instance, one may generate reflective areas or segments in a waveguide material, e.g. by creating reflective structures such as particles and/or surface structures.

In other embodiment, the one or more of the reflective segments and colored segments are not comprised by the optical medium, but may especially be configured between the second optical medium surface and the hull. In general, the optical medium will have a structure, especially a plate-like structure (which may optionally be curved), with two main faces, the radiation escape surface and opposite thereof, with the transmissive optical material between, the second optical medium surface. The radiation escape surface is configured farther away from the hull or the coating than the second optical medium surface.

Hence, especially the pattern is configured somewhere between the hull and the radiation escape surface. The pattern may consist of segments that are within the same layer or that are in layers behind one another. It become irrelevant onto which of the original surfaces the pattern may be applied. A skilled person will understand that one could for instance paint the UV reflector (i.e. UV reflecting segments or layer) on top of a colored layer on top of the (steel) hull, or paint dots of both color and UV-reflector on the steel; or both on the optical medium, etc., especially as long as the result is a mix of color and UV reflector (i.e. an arrangement of reflective and colored segments.

The second optical medium surface is configured adjacent to the coating layer. Hence, the second optical medium surface may be configured in physical contact with the coating layer. The second optical medium surface may be configured in physical contact with up to 100% of the coating layer. However, in other embodiments there may be a distance between the second optical medium surface, such as in the range of 0.1-200 mm, such as 2-100 mm. Hence, in an embodiment the optical medium is configured adjacent to, especially in a further variant, in physical contact with a part of the coating layer on the hull. Especially, the anti-biofouling system, more especially the UV emitting element, may be configured such that at least part of the hull is shielded and the UV emitting element, especially the optical medium is configured as (part of the) external surface of the hull.

As indicated above, the UV emitting element may especially comprise an optical medium, such as waveguide plate. The optical medium may also be provided as a (silicone) foil for applying to the protected surface, the foil optionally comprising at least one light source for generating anti-fouling light and a sheet-like optical medium for distributing the UV radiation across the foil. In embodiments the foil has a thickness in an order of magnitude of a couple of millimeters to a few centimeters, such as 0.1-5 cm, like 0.2-2 cm. In embodiments, the foil is not substantially limited in any direction perpendicular to the thickness direction so as to provide substantially large foil having sizes in the order of magnitude of tens or hundreds of square meters. The foil may be substantially size-limited in two orthogonal directions perpendicular to the thickness direction of the foil, so as to provide an anti-fouling tile; in another embodiment the foil is substantially size-limited in only one one direction perpendicular to a thickness direction of the foil, so as to provide an elongated strip of anti-fouling foil. Hence, the optical medium, and even also the lighting module, may be provided as tile or as strip. The tile or strip may comprise a (silicone) foil.

Further, in an embodiment the optical medium may be disposed proximate (including optionally attached to) to the protected surface and coupled to receive the ultraviolet light, wherein the optical medium has a thickness direction perpendicular to the protected surface, wherein two orthogonal directions of the optical medium orthogonal to the thickness direction are parallel to the protected surface, wherein the optical medium is configured to provide a propagation path of the ultraviolet light such that the ultraviolet light travels within the optical medium in at least one of the two orthogonal directions orthogonal to the thickness direction, and such that, at points along a surface of the optical medium, respective portions of the ultraviolet light escape the optical medium.

In an embodiment the lighting module comprises a two-dimensional grid of light sources for generating UV radiation and the optical medium is arranged to distribute at least part of the UV radiation from the two-dimensional grid of light sources across the optical medium so as to provide a two-dimensional distribution of UV radiation exiting the light emitting surface of the light module. The two-dimensional grid of light sources may be arranged in a chicken-wire structure, a close-packed structure, a rows/columns structure, or any other suitable regular or irregular structure. The physical distance between neighboring light sources in the grid may be fixed across the grid or may vary, for example as a function of light output power required to provide the anti-fouling effect or as function of the location of the lighting module on the protected surface (e.g location on the hull of a ship). Advantages of providing a two-dimensional grid of light sources include that the UV radiation may be generated close to the areas to be protected with UV radiation illumination, and that it reduces losses in the optical medium or light guide and that it is increasing homogeneity of the light distribution. Preferably, the UV radiation is generally homogeneously distributed across the emission surface; this reduces or even prevents under-illuminated areas, where fouling may otherwise take place, while at the same time reducing or preventing energy waste by over-illumination of other areas with more light than needed for anti-fouling. In an embodiment, the grid is comprised in the optical medium. In yet an embodiment, the grid may be comprised by a (silicone) foil. The invention is however not limited to silicone material as UV transmissive material (optical medium material). Also other (polymeric) materials may be applied that are transmissive for UV radiation, such as silica, PDMS (polydimethylsiloxane), teflon, and optionally (quartz) glass, etc. Such materials are herein also indicated as "transmissive optical medium material".

Herein, the term "optical medium unit" especially refers to the combination of the optical medium and one or more of the reflective segments and colored segments. For instance, such optical medium unit may be configured adjacent to the coating layer (see further also below). Hence, in embodiments (i) the coating layer comprises a continuous colored layer, and one or more of the coating layer and the optical medium unit further comprise a patterned reflective layer with at least part of the transmissive optical medium material configured between said patterned reflective layer and said radiation escape surface, wherein said continuous colored layer and said patterned reflective layer are configured to provide said pattern comprising colored segments and UV reflective segments. Alternatively or additionally, in embodiments (ii) the coating layer comprises a continuous reflective layer and one or more of the coating layer and the optical medium unit further comprise a patterned colored layer with at least part of the transmissive optical medium material configured between said patterned colored layer and said radiation escape surface, wherein said continuous reflective layer and said patterned colored layer are configured to provide said pattern comprising colored segments and UV reflective segments.

Hence, one or more of the reflective segments and colored segments may be provided to the second optical medium surface and/or may be provided to the hull. Hence, in embodiments the one or more of the reflective segments and colored segments may be provided as coating to the second optical medium surface and/or the one or more of the reflective segments and colored segments may be comprised by the coating layer (on the hull). Hence, in embodiments the second optical medium surface comprises one or more of (i) said patterned colored layer, and (ii) said patterned reflective layer. Additionally or alternatively, in embodiments the coating layer comprises one or more of (i) said patterned reflective layer and (ii) said patterned colored layer. For instance, one may apply the pattern to the hull or to the (existing) coating layer and then configure the optical medium to the coating layer.

In this way a kind of dithering may be achieved, by which the presence of the reflective areas may be masked and a viewer only perceives a homogeneous color. In a dithered image, colors that are not available in the palette are approximated by a diffusion of colored pixels from within the available palette. The human eye perceives the diffusion as a mixture of the colors within it. This may for instance also be used to correct for instance the color change or difference due to the presence of the optical medium and the reflective segments. Hence, especially the segments have dimensions such that when perceived by a viewer at some distance from the radiation escape surface, the viewer perceives through the optical medium a homogenous color, such as e.g. identical to the color of the coating layer surrounding the UV emitting element. Hence, especially the colored segments and the UV reflective segments of the pattern have areas selected from the range of 0.01 $mm^2$ to 0.5 $m^2$, especially 0.1 $mm^2$ to 0.5 $m^2$, such as 1 $mm^2$ to 0.5 $m^2$. Even more especially, one or more of the colored segments and the UV reflective segments of the pattern have areas selected from the range of 4 $mm^2$ to 0.1 $m^2$, like at least 1 $cm^2$, such as at least 4 $cm^2$. The areas of individual colored segments and individual reflective segments may be substantially the same; however, they may also differ. In this way, one may optimize the tint of the colored segments and the number and/or sizes of reflective segments. Further, especially regular patterns may be created, such as the earlier indicated checkerboard. One or more of the segments may have a substantial square shape. However, one or more of the segments may also have another shape than square, such as rectangular, circular or elliptical. For instance, reflective dots may be used with a colored background. Further, the segments may also be provided with a substantially continuous layer of a first type, such as UV reflective or colored, with a pattern of segments of a second type, such as colored or UV reflective. In this way, also a dithered pattern may be achieved.

As indicated above, the colored segments may be used to correct for the color change perceived by a viewer due to the presence of the optical medium and especially the reflective segments. Hence, in an embodiment the coating layer may have a first color and the colored segments may have a second color, wherein the second color has a stronger tint than the first color. In color theory, a tint is the mixture of a color with white, which increases lightness, and a shade is the mixture of a color with black, which reduces lightness. A tone is produced either by the mixture of a color with gray, or by both tinting and shading. Mixing a color with any neutral color (including black, gray and white) reduces the chroma, or colorfulness, while the hue remains unchanged. In common language, the term "shade" can be generalized to furthermore encompass any varieties of a particular color, whether technically they are shades, tints, tones, or slightly different hues; while the term "tint" can be generalized to refer to the any lighter or darker variation of a color. Instead of the term "stronger tint" also the term "higher saturation" may be applied.

The UV radiation can be provided to the optical medium with a light source adjacent to the optical medium or with a light source remote from the optical medium (such as via a waveguide). However, the light source may also at least partly be embedded in the optical medium. Hence, in an embodiment the anti-biofouling system comprises an UV emitting element comprising said optical medium and said light source at least partly enclosed by the optical medium and configured to provide said UV radiation. In such embodiment, the position of the light source(s) and the segments may be optimized, especially by configuring the light sources closer to the reflective segments than to the colored segments. Hence in a further embodiment, the colored segments, the UV reflective segments and the light source are configured to provide a first shortest distance from the UV light source to a neighboring UV reflective segment and a second shortest distance from the UV light source to a neighboring colored segment, with the first shortest distance being smaller than the second shortest distance. In a specific embodiment, the position of the light source(s) and the UV reflective segments may be optimized, especially by configuring the light sources and reflective segments such, that outcoupling from the radiation escape surface is maximized and/or absorption by the colored segments is minimized.

As indicated above, in a further aspect the invention also provides an optical medium unit per se. Especially, the optical medium unit comprises an optical medium, wherein the optical medium is transmissive for light (and UV radiation), wherein the optical medium comprises a radiation escape surface and a second optical medium surface with at least part of the transmissive optical medium material configured between said radiation escape surface and said second optical medium surface, wherein the optical medium unit further comprise a pattern of one or more of first segments and second segments, with at least part of the transmissive optical medium material configured between said pattern and said radiation escape surface, wherein the first segments comprise colored segments, or wherein the second segments comprise UV reflective segments, or wherein the first segments comprise colored segments and the second segments comprise UV reflective segments. Such optical medium unit may be configured adjacent to the coating layer. Hence, in an embodiment the optical medium unit comprises a pattern of one or more of first segments and second segments, wherein the second segments comprise UV reflective segments and wherein the first segments are transmissive for light In embodiments, (at least part of) the coating layer comprises a reflective layer, such that in combination with an optical medium unit comprising a patterned colored layer, the pattern is provided. In yet other embodiments, (at least part of) the coating layer comprises a colored layer, such that in combination with an optical medium unit comprising a patterned reflective layer, the pattern is provided. In embodiments, (at least part of) the coating layer comprises a patterned reflective layer, such that in combination with an optical medium unit comprising a patterned colored layer, the pattern is provided. In yet other embodiments, (at least part of) the coating layer comprises a patterned colored layer, such that in combination with an optical medium unit comprising a patterned reflective layer, the pattern is provided.

Hence, in embodiments the second optical medium surface comprises one or more of (i) a patterned colored layer comprising said colored segments, and (ii) a patterned reflective layer comprising said reflective segments. In yet other embodiments, the optical medium unit comprises the pattern (and may thus be configured as such to the coating layer and thereby provided the anti-biofouling system as defined above. Therefore, in yet a further embodiment the second optical medium surface comprises said patterned colored layer and said patterned reflective layer. As indicated above, the colored segments and the UV reflective segments of the pattern have areas selected from the range of 0.01 mm$^2$ to 0.5 m$^2$, especially selected from the range of 1 mm$^2$ to 0.1 m$^2$, such as at least 4 mm$^2$.

As indicated above, the optical medium may also include light sources (or at least part thereof). Hence in a further embodiment the optical medium unit further comprises a light source at least partly enclosed by the optical medium and configured to provide UV radiation downstream from said radiation escape surface. Again, as also indicated above, especially the light sources and segments may be aligned for optimal result with respect to UV radiation outcoupling. Hence, in an embodiment the first segments, the second segments, and the light sources are configured to provide a first shortest distance (d1) from the UV light sources to a neighboring second segment and a second shortest distance (d2) from the UV light sources to a neighboring first segment, with the first shortest distance (d1) being smaller than the second shortest distance (d2). Especially, the optical medium unit comprises a plurality of light sources (at least partly embedded in the optical medium material).

In yet a further aspect, the invention also provides a method of configuring an anti-biofouling system to a vessel comprising a hull, wherein the hull comprises a coating layer, wherein the anti-biofouling system comprises an optical medium, wherein the optical medium is transmissive for light, and wherein the optical medium comprises a radiation escape surface and a second optical medium surface with at least part of the transmissive optical medium material configured between said radiation escape surface and said second optical medium surface, wherein the method comprises configuring the optical medium, and a pattern comprising colored segments and UV reflective segments to at least part of said coating layer with at least part of the transmissive optical medium material configured between said pattern and said radiation escape surface, and providing a light source configured to provide UV radiation, to provide said anti-biofouling system configured to provide said UV-radiation downstream from said radiation escape surface of said optical medium in a direction away from said hull.

Especially, in dependence of the color of the coating layer, the color of the colored segments may be determined, such that the perception of the color of the (combined pattern of color+UV reflector) perceived through the optical medium may be substantially the same as the color of the original coating layer and/or the coating layer surrounding the UV emitting element, especially the optical medium. The desired color of the colored segments can be chosen and provided to the optical medium. In this way the optical medium unit can be configured to the hull and provide the desired color and UV radiation outcoupling. Hence, in an embodiment the coating layer has a first color, and the method further comprises providing the colored segments with a second color, wherein the second color has a stronger tint than the first color, such that when perceived through the optical medium the first color and the second color have the same tint. Hence, in places where no optical medium is arranged the color (from a distance perceived by a viewer) is the same as at places where the optical medium is placed, and/or a vessel in the same colors without the optical medium is perceived as having substantially the same color(s) as a vessel with having one or more optical mediums configured to the hull.

Further, the term "colored segments" may also refer to a plurality of differently colored segments.

Further, the vessel or the optical medium unit may include a plurality of colored segments, a plurality of UV reflective segments and optionally also one or more light transmissive segments. The color perception of the optical medium may, due to these three types of segments be the same as without the optical medium or when viewing only directly through the light transmissive segments. Such embodiment may e.g. be created with an optical medium unit with a UV reflective coating at the second optical medium surface with therein a pattern comprising colored segments and segments that are uncoated (and (thus) also not colored).

Hence, amongst others in the above indicated ways the invention provides a dithered UV reflective coating with color, especially for marine applications.

In a further aspect, the invention also provides a method of anti-(bio)fouling (a part of) an external surface of an object that is during use at least temporarily exposed to water, the method comprising: providing the anti-biofouling system as defined herein to the object, generating the UV radiation (during use of the object), optionally as function of one or more of (i) a feedback signal (such as related to biofouling risk and/or a human UV radiation exposure risk), and (ii) a timer for (periodically) varying the intensity of the UV radiation (anti-fouling light), and providing said UV radiation (during an irradiation stage) to (the part of) the external surface.

Herein, the invention is especially described in relation to a vessel with a hull. However, in another aspect the invention also may be applied to another (marine) object with an external surface. For instance, a lighthouse may have a specific prescribed color, such as red, to be best visible in foggy weather. Or on oil rigs, the escapes routes are indicated with signs in bright green or orange. Hence, more in general the invention also provides an object (such as a vessel) comprising an external surface (such as a hull) with a coating layer, the object further comprising an anti-biofouling system comprising an optical medium and a light source configured to provide UV radiation, wherein the optical medium is transmissive for light, wherein the optical medium comprises a radiation escape surface and a second optical medium surface with at least part of the transmissive optical medium material configured between said radiation escape surface and said second optical medium surface, wherein the optical medium is configured adjacent to at least part of the coating layer with the second optical medium surface configured closer to the hull than the radiation escape surface, wherein the anti-biofouling system is configured to provide said UV-radiation downstream from said radiation escape surface in a direction away from said hull, and wherein the object further comprises a pattern of colored segments and UV reflective segments with at least part of the transmissive optical medium material configured between said pattern and said radiation escape surface. Especially, such external surface is configured to be exposed, at least temporarily, to water, such as seawater, or to humid conditions, such as humid air and/or splashes. Especially, the object may be selected from aquatic applications that are in general arranged substantially stationary, such as a dam, a sluice, a pontoon, an oilrig, etc. etc. However, the object may also be a buoy. The object may also be (part of) a pier, a wharf.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

A typical anti-fouling solution may essentially consist of a stack of various different materials, with various functions. Enumerating them from the steel hull outwards to the water, we may encounter a corrosion protection layer, a layer of paint in the company colors, an optical layer, which will have the UV sources embedded in it, and a optionally a top layer, providing for a sturdy mechanical interface towards the water.

A drawback of such simple stack is the fact that typically about 50% of the UV light is emitted towards the hull, where it may serve no purpose; and not towards the water (where it should go). Secondly, the UV radiation is not necessarily very compatible with the anti-corrosion paint and/or may imply additional demands on its composition to prevent degradation. A relatively straightforward solution would be to insert a UV reflective layer between the optical layer and the anti-corrosion layer. However, this also has a drawback that the UV reflective materials typically reflect all light in the visible wavelength range as well. This implies that they appear white to the human eye; which is not what the ship owners may desire. Hence, herein it is proposed to apply the UV reflective coating in a dithered pattern. A very common example of dithering is known from printing a newspaper, where fine patterns of black dots are used to create the perception of various shades of grey.

The present invention includes application of the UV reflective coating in a dithered pattern, e.g. on top of a solid layer of the company-color paint in a much darker tint/higher saturation (but thus substantially the same hue). The darker hue company color, with a pattern of UV reflective dots (=white) on top, will appear to the human eye as having the correct color. Depending on the desired (company) color to achieve, typically half of the surface can be covered in (white) UV reflective paint, while still showing the correct underlying company color.

A typical embodiment of the invention may include the following elements:

a layer of paint in a specific desired company color, though darker (more saturated) than required when this would be the only color.

a pattern of UV reflective paint (e.g. dots, stripes or patches), covering only a percentage (<100%) of the surface; thus showing the paint underneath as well an UV emitting layer A more detailed embodiment could have the UV reflective dots aligned with the UV sources, thus providing the highest level of UV reflectance in areas where the UV load is the highest. In this way, a much higher than 50% UV reflectivity can be obtained, while only covering a small percentage of the (company) color with white UV reflective paint. Such embodiments are described below in reference to the accompanying drawings.

Figure 1A:
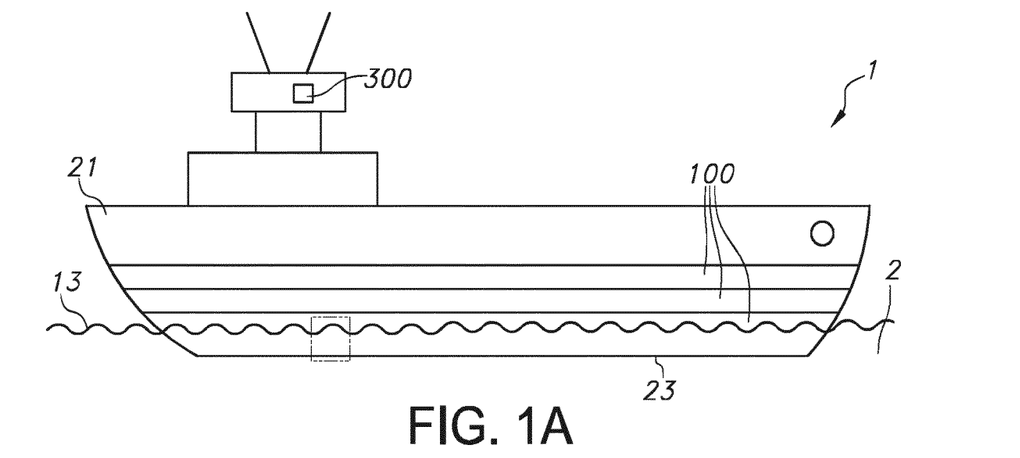
FIGS. 1a-1c schematically depict some aspects of the invention.

FIG. 1a schematically depicts a vessel 1 comprising a hull 21. Reference 100 indicates a coating. Note that the coating 100 may include different areas with different colors. In the present invention, the optical medium will especially be applied to an area with a single color although other embodiments are not excluded. Reference 13 indicates the water line of water 2. Reference 300 indicates a control system, especially configured to control the anti-biofouling system, which is further elucidated below. The dashed area in FIG. 1a is enlarged in FIG. 1b. Reference 23 indicates the keel of the vessel 1.

Figure 1B:
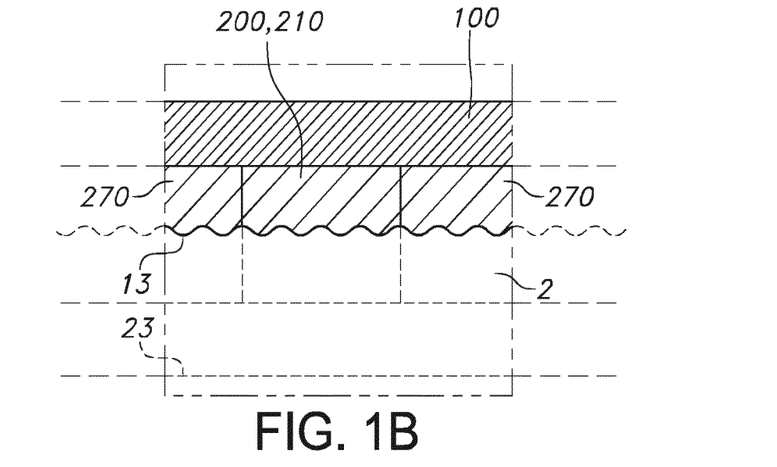

FIG. 1b schematically shows a part of the hull 21. Part of the coating layer 100 is not covered with the optical medium 270 of the anti-biofouling system. The anti-biofouling system 200 comprises a UV emitting element 210, which comprises the optical medium 270. The anti-biofouling system 200 may comprise different parts, which may not necessarily all be configured to the hull. For instance, the anti-biofouling system 200 may also include the control system 300. The optical medium 270 configured to the coating layer 100 may lead to a reduction in color tint of the coating layer 100. Further, the presence of UV reflective material in a pattern comprised by the optical medium unit (see further below), may especially lead to a reduction in color tint. This is schematically indicated by FIG. 1b. Note that the invention is thus especially of relevance when the coating layer comprises a color (≠white and ≠black) or is grey (a stronger tint is black).

Figure 1C:
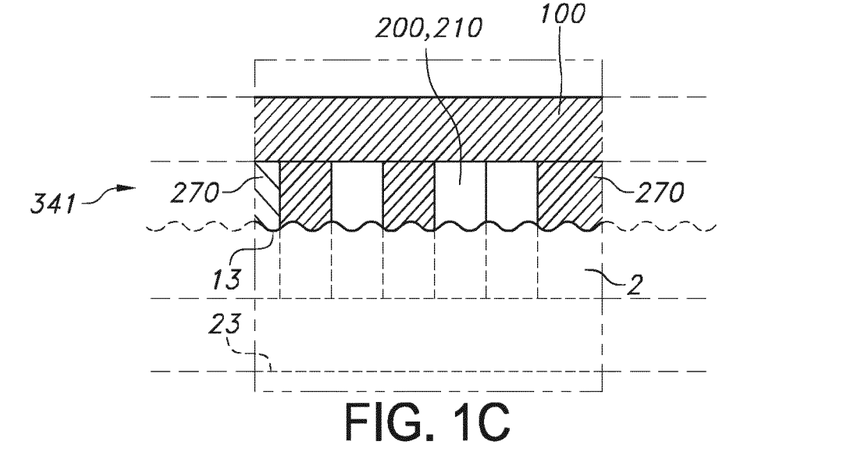

FIG. 1c schematically depicts how by dithering the lighter tint due to the presence of the white reflective areas can be compensated. White segments are alternated with darker segments, darker than the original coating layer 100. In this way, when seen from a distance, the coating layer 100 above the optical medium 270, which part of the coating layer is indicated with reference 100*, and the pattern 341 may have the same perceived tint.

Figure 2A:
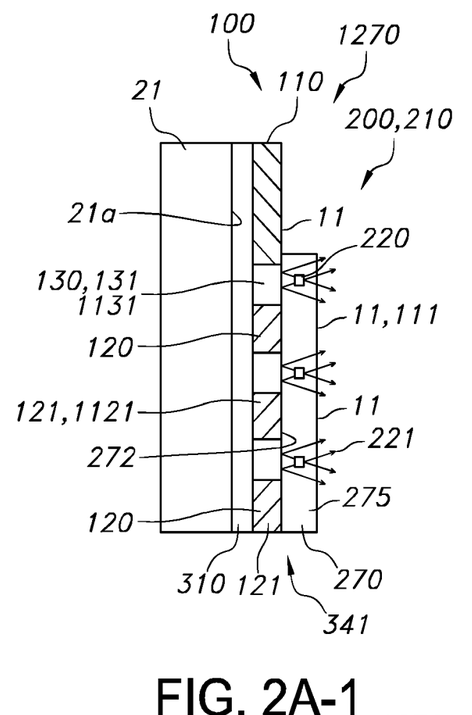
FIGS. 2a-2f schematically depict some further aspects of the invention.
Figure 2A:
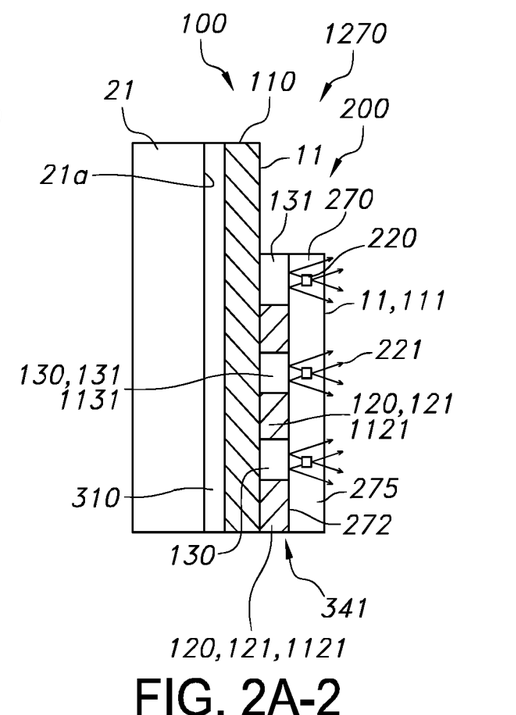
Figure 2A:
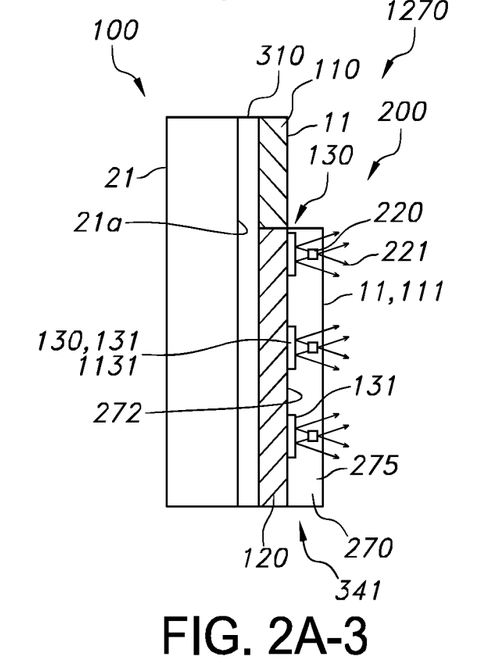
Figure 2A:
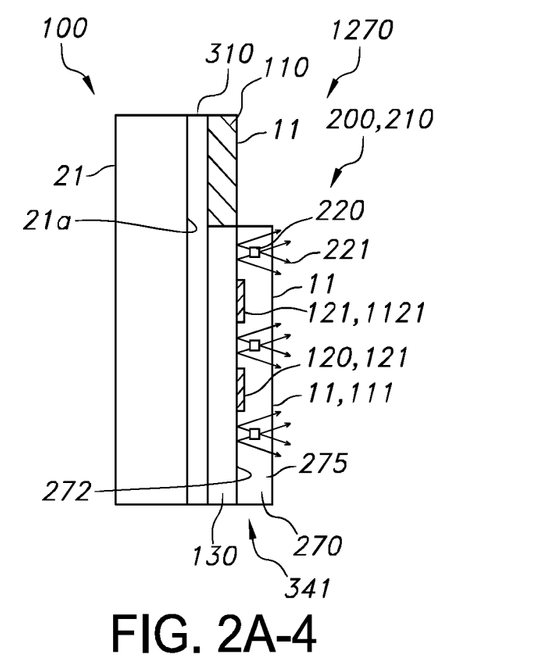
Figure 2B:
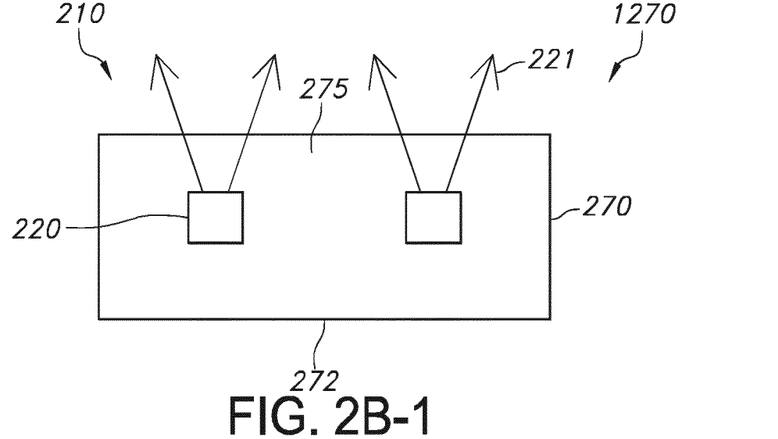
Figure 2B:
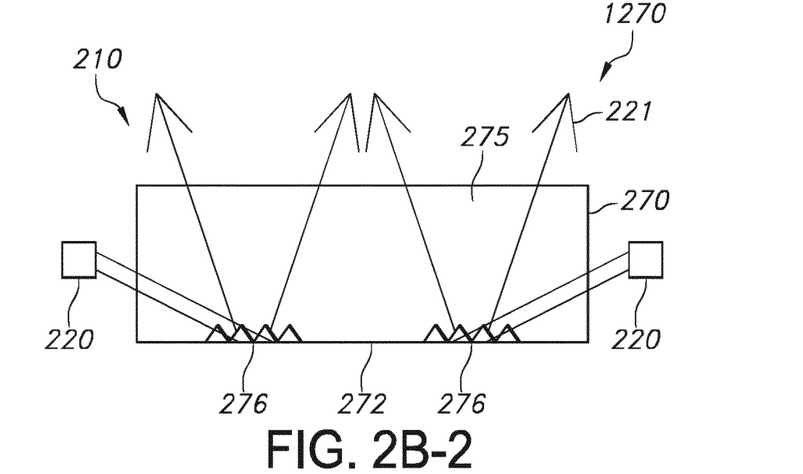

FIG. 2a schematically depicts several configurations of the pattern 341 and the optical medium, though not an exhaustive overview is provided. Reference 310 indicates an optional coating layer, such as an anti-corrosion (paint) layer. The schematic drawings may e.g. depict part of a vessel wall or hull 21.

In embodiment 1, the coating comprises a first color layer 110, e.g. red. For the application of the optical medium, part of this red layer may not be provided or replaced with the pattern 341. The pattern 341 comprises a first color layer 120 and second reflective layer 130, with the former comprising colored segments 121 and with the latter comprising reflective segments 131. The configuration of the segments 121, 131 provides the pattern. By way of example, the optical medium 270 comprises at least part of the light sources 220 which are configured to provide UV radiation 221. Part of the UV radiation 221 is reflected by the reflective segments 131. Reference 111 indicates the radiation escape surface, from which the UV radiation may escape; reference 272 indicates the second optical medium surface, opposite of the radiation escape surface 111. Transmissive optical medium material 275 is configured between. The material is transmissive for visible light and also for UV radiation of the light source(s) 220. Further, an UV emitting element 210 is depicted, which here essentially consists of the optical medium and the light source(s). Hence, this schematic embodiment also depicts an embodiment of an optical medium unit, indicated with reference 1270. The optical medium unit 1270 comprises the optical medium and the pattern 341. References 1121 and 1131 refer to first segments and second segments, which is further elucidated below.

In embodiment 2 a coating 100 comprising the first color layer 110 is substantially covering the hull 21. Note that nevertheless there may be regions with other first color layers. Here, it refers to a part of the hull with a uniform color, including grey. Part of the hull 21 may be provided with the UV emitting unit 210; especially part of the hull may be provided with the optical medium 270. For instance, to obtain the dithering aspect, on the first color layer the pattern 341 is provided by providing a patterned color layer 120 with colored segments 121 and a patterned reflective layer 130 with reflective segments 131. Thereon, the optical medium 270 is provided. Hence, at least part of the transmissive optical medium material 275 is configured between said pattern 341 and said radiation escape surface 111.

Variants 3 and 4 are substantially mirror images of each other. In both cases, the combination of a continuous layer and a segmented layer may also lead to the pattern 341. In variant 3 a continuous colored layer 120 is provided. Hence, this layer per se does not provide colored segments separated from each other. Further, reflective layer 130 is provided which is discontinuous and includes the reflective segments 131. These reflective segments 131, which are separated from each other, provide together with the continuous colored layer 120 the pattern 341. For instance, the tint of the continuous colored layer may be stronger than the tint of the first color layer, but those both having substantially the same hue (such as light blue and dark blue). Variant 4 is the other way around, with a continuous reflective layer 130 and a segmented colored layer 120, with colored segments 121, together providing the pattern 341.

As can be derived from these variants, the optical medium unit 270 may be provided in different variants, such as the optical medium 270 only, the optical medium colored segments 121 and reflective segments 131 (for instance suitable for variants 1 and 2), with only reflective segments 131 (variant 3 (and optionally variants 1 or 2)) or with only colored segments 121 (variant 4 (and optionally variants 1 or 2)), with reflective segments 131 and a continuous colored layer 120 (also variant 3), or with colored segments 121 and a continuous reflective layer 130 (also variant 4). Therefore, the invention also provides an optical medium unit 1270 comprising an optical medium 270, wherein the optical medium unit 1270 further comprise a pattern 341 of one or more of first segments 1121 and second segments 1131, with at least part of the transmissive optical medium material 275 configured between said pattern 341 and said radiation escape surface 111, wherein the first segments 1121 comprise colored segments 121 (for instance variants 1, 2 and 4), or wherein the second segments 1131 comprise UV reflective segments 131 (for instance variants 1, 2 and 3), or wherein the first segments 1121 comprise colored segments 121 and the second segments 1131 comprise UV reflective segments 131 (for instance options 1 and 2).

FIG. 2b schematically depicts two variants of the UV emitting element 210 or the optical medium 270/optical medium unit 1270. In the upper drawing, the light sources 220 are at least partly integrated in the optical medium 270. In this way, UV radiation can easily be distributed through the waveguide or optical medium 270. In the other variant, the light sources 220 are configured external from the optical medium 270. Especially in such instance (though the former variant may optionally also include outcoupling structures), the optical medium 270 may comprise outcoupling structures 276 which are configured to couple the UV radiation 221 out via the radiation escape surface 111. Hence, the outcoupling structures may especially be configured at and/or close to the second optical medium surface 272.

Figure 2C:
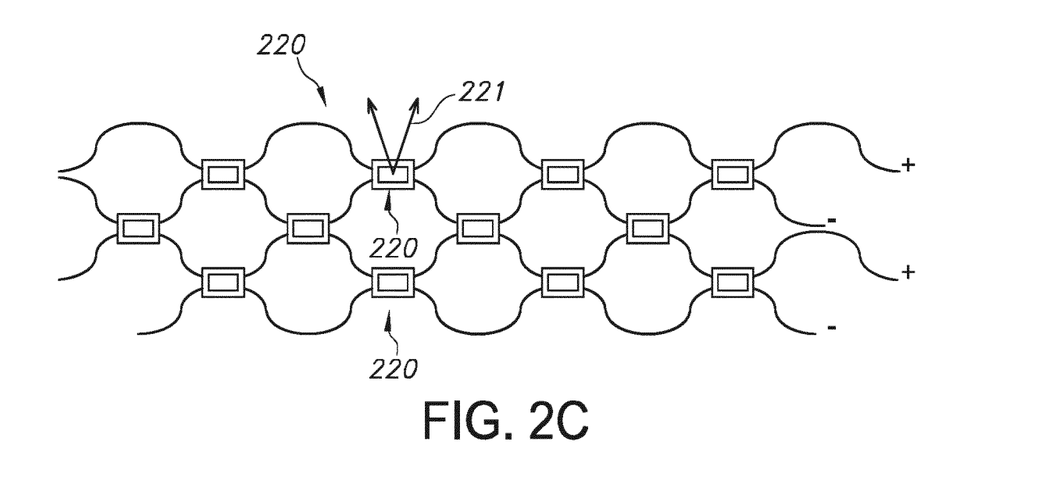

FIG. 2c shows a chicken-wire embodiment where light sources 220, such as UV LEDs, are arranged in a grid and connected in a series of parallel connections. The LEDs can be mounted at the nodes either through soldering, gluing or any other known electrical connection technique for connecting the LEDs to the chicken wires. One or more LEDs can be placed at each node. DC or AC driving can be implemented. If AC is used, then a couple of LEDs in anti parallel configuration may be used. The person skilled in the art knows that at each node more than one couple of LEDs in anti parallel configuration can be used. The actual size of the chicken-wire grid and the distance between UV LEDs in the grid can be adjusted by stretching the harmonica structure. The chicken-wire grid may be embed in an optical medium.

Figure 2D:
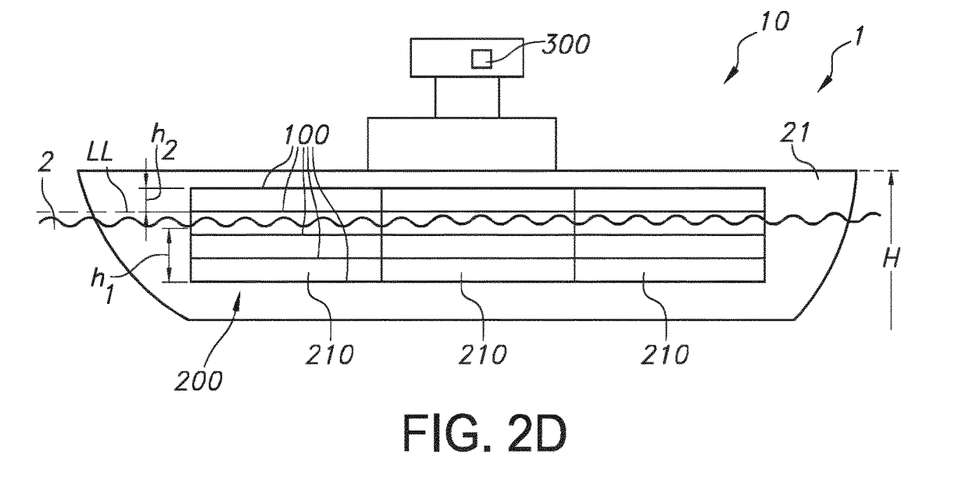

FIG. 2d schematically depicts an embodiment wherein a vessel 1, as embodiment of the object 10, comprises a plurality of anti-biofouling systems 200 and/or a one or more of such anti-biofouling systems 200 comprising a plurality of UV emitting elements 210. For instance, dependent upon the height of the specific such anti-biofouling system 200 and/or the height of the UV emitting elements 210, such as relative to a water (line), the respective UV emitting elements 210 may be switched on. FIG. 2d also indicates the load line LL. About 0.5-2 m above, indicated with h2, and about 0.5-2 m below, indicated with h1, the load line LL, the UV emitting elements 210 may be applied. Further, the control system 300 may be configured to control the anti-biofouling system 200.

Figure 2E:
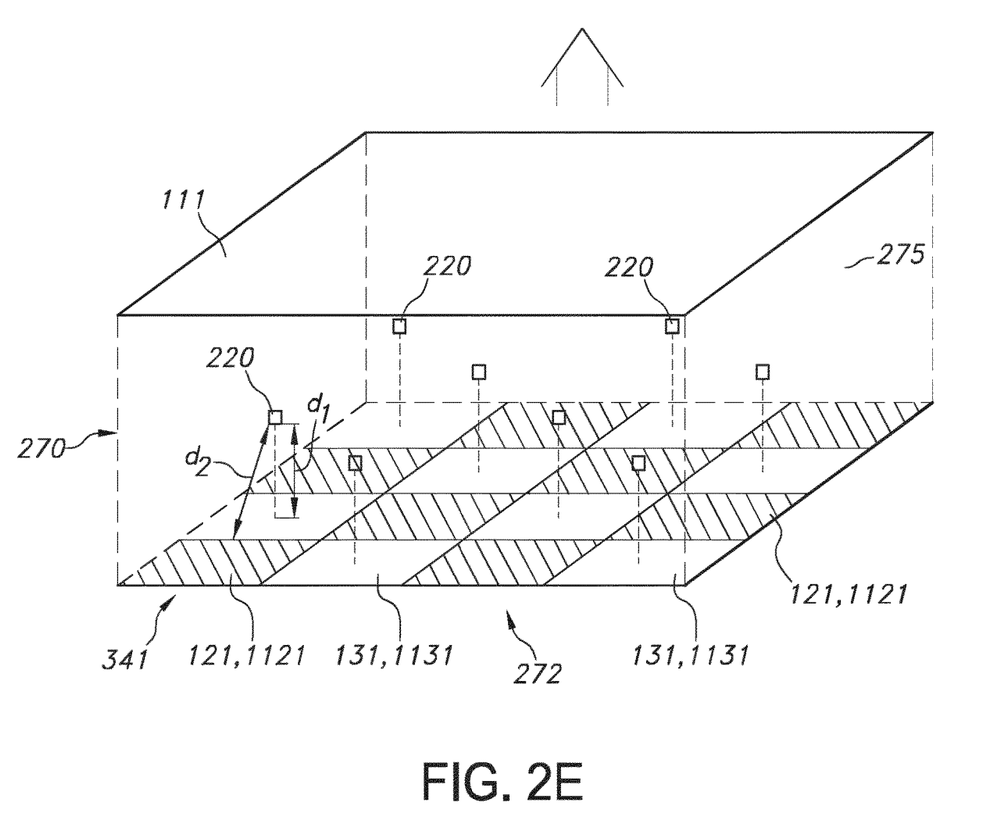
Figure 2F:
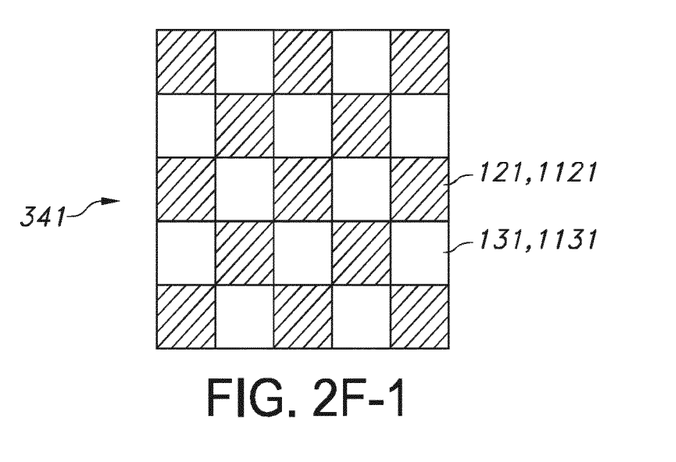
Figure 2F:
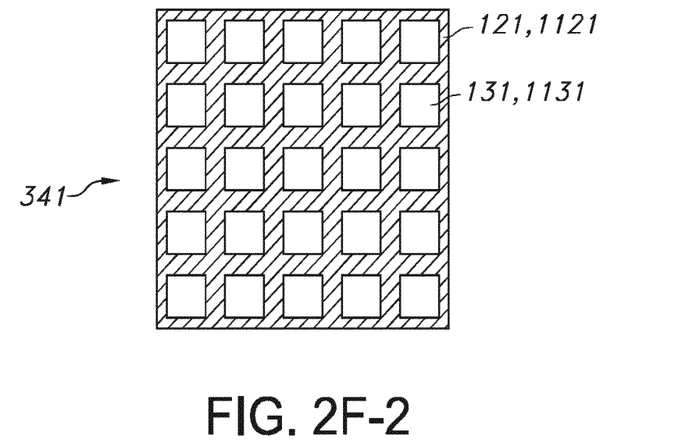
Figure 2F:
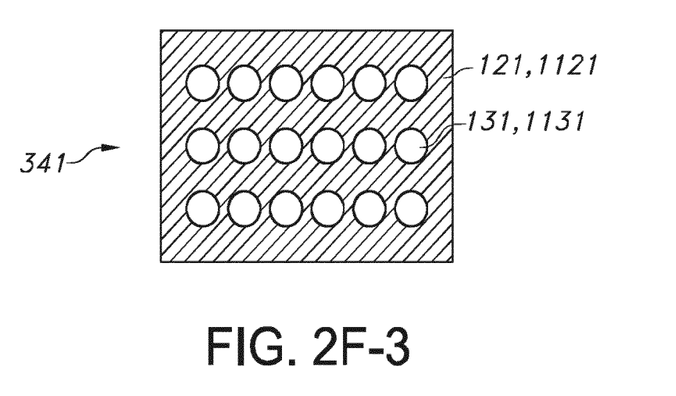

FIG. 2e schematically depicts how light sources 220 can be configured relative to the segments (to be created). Hence, the optical medium 270 in this embodiment at least partly encloses the light sources 220. First segments 1121 and second segments 1131 are defined. The former will during application (see e.g. the embodiments of FIG. 2a) of the optical element provide the colored segments 131; the latter will during application of the optical element provide the reflective segments. Hence, the light sources 220 have to be configured closer to the second segments than to the first segments, even though none of the first segments and/or second segments comprise already the respective colored segments and reflective segments.

Hence, the first segments 1121, the second segments 1131, and the light sources 220 are configured to provide a first shortest distance d1 from the UV light sources 220 to a neighboring second segment 1131 and a second shortest distance d2 from the UV light sources 220 to a neighboring first segment 1121, with the first shortest distance d1 being smaller than the second shortest distance d2. FIG. 2e schematically depicts a checkerboard configuration. Note however that e.g. the first segments (and/)or second segments may also have another shape, like a circular shape.

FIG. 2f schematically depicts three possible variants of patters, though many more variants are possible, such as with different packings or also including other segments. The first variant 1 shows a checker board configuration of the segments. The second variant 2 and third variant 3 both show a substantially continuous layer including segments, by which the substantially continuous layer is effectively also divided in segments.

Hence, herein it is proposed to apply a UV reflective coating in a special pattern known as dithering. In this way, a higher optical efficiency can be achieved, while maintaining the highly desirable look & appearance (company color) of the boat/hull/surface.

Further embodiments may e.g. include for instance a dark blue paint on the (steel) hull, covered with a layer of silicones which has a 50% coverage of white UV reflective dots on one surface, and the other 50% of the surface being substantially transparent, or a bare (steel) hull, covered by a layer of silicones which is covered for 50% in UV reflective dots/stripes, and the remaining part of that same surface covered in e.g. dark blue. Yet a further embodiment may e.g. include a 100% color cover on the hull with a patterned reflective layer on the inside of a silicone optical medium (unit), or a 100% reflective cover on the hull with a colored pattern on the inside of silicone optical medium (unit), or a patterned color on the hull with a patterned reflective cover on the inside of silicone optical medium (unit), or a patterned reflector on the hull with a patterned color on the inside of silicone optical medium (unit), etc.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A vessel comprising:
   a hull with a coating layer,
   an anti-biofouling system, the anti-biofouling system comprising:
     an optical medium; and
     a light source,
     wherein the light source is arranged to provide UV radiation,
     wherein the optical medium is transmissive for light,
     wherein the optical medium comprises a radiation escape surface and a second optical medium surface,
     wherein at least part of the transmissive optical medium material is disposed between the radiation escape surface and the second optical medium surface,
     wherein the optical medium is disposed adjacent to at least part of the coating layer with the second optical medium surface arranged closer to the hull than the radiation escape surface,
     wherein the anti-biofouling system is arranged to provide the UV-radiation downstream from the radiation escape surface in a direction away from the hull,
     wherein the vessel further comprises a pattern of colored segments and UV reflective segments,
     wherein at least part of the transmissive optical medium material is disposed between the pattern and the radiation escape surface.

2. The vessel according to claim 1,
   wherein an optical medium unit comprises the optical medium,
   wherein the coating layer comprises a continuous colored layer,
   wherein one or more of the coating layer and the optical medium unit further comprise a patterned reflective layer,
   wherein at least part of the transmissive optical medium material is disposed between the patterned reflective layer and the radiation escape surface,
   wherein the continuous colored layer and the patterned reflective layer are arranged to provide the pattern of colored segments and UV reflective segments.

3. The vessel according claim 2, wherein the second optical medium surface comprises one or more of the patterned colored layer, and the patterned reflective layer.

4. The vessel according to claim 2, wherein the coating layer comprises one or more of the patterned reflective layer and the patterned colored layer.

5. The vessel according to claim 1,
wherein the optical medium is arranged in physical contact with a part of the coating layer on the hull,
wherein the coating layer has a first color,
wherein the colored segments have a second color,
wherein the second color has a stronger tint than the first color.

6. The vessel according to claim 1, wherein the colored segments and the UV reflective segments of the pattern have areas selected from the range of 1 mm$^2$ to 0.5 m$^2$.

7. The vessel according to claim 1,
wherein the anti-biofouling system comprises an UV emitting element,
wherein the UV emitting element comprises the optical medium,
wherein the light source at least partly enclosed by the optical medium,
wherein the light source is arranged to provide the UV radiation,
wherein the colored segments, the UV reflective segments and the light source are arranged to provide a first shortest distance from the UV light source to a neighboring UV reflective segment and a second shortest distance from the UV light source to a neighboring colored segment,
wherein the first shortest distance is smaller than the second shortest distance.

8. The anti-biofouling system according to claim 7,
wherein an optical medium unit comprises the optical medium,
wherein the coating layer comprises a continuous colored layer,
wherein one or more of the coating layer and the optical medium unit further comprise a patterned reflective layer,
wherein at least part of the transmissive optical medium material is disposed between the patterned reflective layer and the radiation escape surface,
wherein the continuous colored layer and the patterned reflective layer are arranged to provide the pattern of colored segments and UV reflective segments.

9. The anti-biofouling system according claim 8, wherein the second optical medium surface comprises one or more of the patterned colored layer, and the patterned reflective layer.

10. The vessel according to claim 1, wherein the coating layer comprises one or more of the patterned reflective layer and the patterned colored layer.

11. The vessel according to claim 1 further comprising a dithered pattern of colored segments and UV reflective segments behind the optical medium to provide different light extraction from the optical medium so as to generate a desired color with a predetermined tint through the optical medium.

12. The vessel according to claim 1,
wherein an optical medium unit comprises the optical medium,
wherein the coating layer comprises a continuous reflective layer,
wherein one or more of the coating layer and the optical medium unit comprise a patterned colored layer with at least part of the transmissive optical medium material disposed between the patterned colored layer and the radiation escape surface,
wherein the continuous reflective layer and the patterned colored layer are arranged to provide the pattern of colored segments and UV reflective segments.

13. An optical medium unit comprising an optical medium,
wherein the optical medium is transmissive for light,
wherein the optical medium comprises a radiation escape surface and a second optical medium surface with at least part of the transmissive optical medium material disposed between the radiation escape surface and the second optical medium surface,
wherein the optical medium unit further comprise a pattern of one or more of first segments and one or more second segments,
wherein at least part of the transmissive optical medium material is disposed between the pattern and the radiation escape surface,
wherein the first segments comprise colored segments and the second segments comprise UV reflective segments,
wherein the colored segments and the UV reflective segments of the pattern have areas selected from the range of 1 mm$^2$ to 0.5 m$^2$.

14. An anti-biofouling system comprising:
an optical medium; and
a light source,
wherein the light source is arranged to provide UV radiation,
wherein the optical medium is transmissive for light,
wherein the optical medium comprises a radiation escape surface and a second optical medium surface,
wherein at least part of the transmissive optical medium material is disposed between the radiation escape surface and the second optical medium surface,
wherein the optical medium is disposed adjacent to at least part of a coating layer,
wherein the coating layer is disposed on a first surface,
wherein the second optical medium surface arranged closer to the first surface than the radiation escape surface,
wherein the anti-biofouling system is arranged to provide the UV-radiation downstream from the radiation escape surface in a direction away from the first surface,
wherein the vessel further comprises a pattern of colored segments and UV reflective segments,
wherein at least part of the transmissive optical medium material is disposed between the pattern and the radiation escape surface.

* * * * *